(12) United States Patent
Gahlot et al.

(10) Patent No.: US 11,768,777 B2
(45) Date of Patent: Sep. 26, 2023

(54) APPLICATION AWARE CACHE MANAGEMENT

(71) Applicant: EMC IP Holding Company LLC, Hopkinton, MA (US)

(72) Inventors: Jai P. Gahlot, Pune (IN); Shiv S. Kumar, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 185 days.

(21) Appl. No.: 16/749,175

(22) Filed: Jan. 22, 2020

(65) Prior Publication Data

US 2021/0224198 A1    Jul. 22, 2021

(51) Int. Cl.
*G06F 12/122*    (2016.01)
*G06F 12/14*    (2006.01)
*G06F 16/2455*    (2019.01)

(52) U.S. Cl.
CPC ........ *G06F 12/122* (2013.01); *G06F 12/1416* (2013.01); *G06F 12/1483* (2013.01); *G06F 16/24552* (2019.01); *G06F 2212/604* (2013.01)

(58) Field of Classification Search
CPC ............. G06F 12/122; G06F 16/24552; G06F 12/1416; G06F 2212/604
See application file for complete search history.

(56) References Cited

U.S. PATENT DOCUMENTS

| 9,122,588 | B1* | 9/2015 | Mondal | G06F 12/0871 |
| 2007/0124341 | A1* | 5/2007 | Lango | G06F 16/10 |
| 2012/0137074 | A1* | 5/2012 | Kim | G06F 9/3004 |
| | | | | 711/122 |
| 2012/0297127 | A1* | 11/2012 | Belluomini | G06F 12/0866 |
| | | | | 711/103 |
| 2014/0173214 | A1* | 6/2014 | Ramrakhyani | G06F 12/08 |
| | | | | 711/135 |
| 2016/0378651 | A1* | 12/2016 | Dulloor | G06F 9/50 |
| | | | | 711/118 |
| 2017/0060554 | A1* | 3/2017 | Asami | G06F 9/4552 |
| 2017/0235681 | A1* | 8/2017 | Kaburaki | G06F 12/0292 |
| | | | | 711/128 |
| 2018/0143746 | A1* | 5/2018 | Stern | H04L 65/4084 |
| 2018/0335968 | A1* | 11/2018 | Pauley | G06F 11/3034 |
| 2019/0339885 | A1* | 11/2019 | Yanagihara | G06T 1/60 |
| 2019/0391933 | A1* | 12/2019 | Gupta | G06F 12/123 |
| 2020/0210340 | A1* | 7/2020 | Zhang | G06F 12/0842 |
| 2020/0258066 | A1* | 8/2020 | Tierney | G06Q 20/352 |
| 2020/0310985 | A1* | 10/2020 | Li | G06F 12/0871 |

* cited by examiner

*Primary Examiner* — Andrew J Cheong
(74) *Attorney, Agent, or Firm* — Ryan, Mason & Lewis, LLP (57) ABSTRACT

Methods, apparatus, and processor-readable storage media for application aware cache management are provided herein. An example computer-implemented method includes maintaining a data structure comprising at least one entry indicative of an importance of at least one of a plurality of applications associated with a storage system; and controlling whether or not a particular data item requested by one of the plurality of applications is cached in a cache memory of the storage system based at least in part on the at least one entry of the data structure.

20 Claims, 8 Drawing Sheets

---

600 — 610: Obtain request from process for read operation for a file f.

620: Check whether requested data are present in cache.

630: If the data are present in cache, then:
  i. Fetch page P from cache and return it to the process.
  ii. Update LRU age of P in EPAM to 1.
  iii. If application priority corresponding to cached page in EPAM is not higher than the current requesting process's priority, then change application priority corresponding to cached page in EPAM to the current requesting process' priority and update effective age of P in EPAM to [1 * (1 + priority of requesting process)].
  iv. If application priority corresponding to cached page in EPAM is higher than the current requesting process's priority, then maintain the application priority.

640: If the data are not present in cache, then:
  i. Read page P from disk.
  ii. If there are multiple pages in EPAM with the same highest effective age, then remove one page with lowest application priority. Otherwise, remove the page having the oldest effective age from cache.
  iii. Fill the empty cache slot in EPAM with page P.
  iv. Update LRU age of P in EPAM to 1.
  v. Update Application priority mentioned in EPAM against the cached page to the current requesting process' priority.
  vi. Update effective age of P in EPAM to [1 * (1 + application priority)].
  vii. Update age of all other pages in EPAM as per normal LRU aging logic.
  viii. Update effective age of P in EPAM to [LRU age * (1 + priority of requesting process)].

310: Obtain request from Application for read operation for a file f.

320: Check whether requested page is present in cache.

330: If requested page is present, then:
  i. Fetch page P from cache and return it to the application.
  ii. If Application is included in CAAL, then do not update LRU age of P in cache.
  iii. If application is not included in CAAL, then update LRU age of P in cache.

340: If requested page is not present, then:
  i. Read page P from disk.
  ii. If Application is not included in CAAL, then copy page P to the cache.
  iii. If Application is included in CAAL, then do NOT copy page P to the cache.

| CACHE AVOIDANCE APPLICATION LIST (CAAL) |
|---|
| APPLICATION IDENTIFIER 1 |
| APPLICATION IDENTIFIER 2 |
| ... |

FIG. 2

| CACHE PAGE | LRU AGE |
|---|---|
| PA1 | 50 |
| PA2 | 25 |
| PA3 | 36 |
| PA4 | 10 |

| APPLICATION | PRIORITY |
|---|---|
| A1 | 0 |
| A2 | 3 |
| A3 | 5 |
| A4 | 9 |
| A5 | 4 |
| A6 | 6 |

- 610: Obtain request from process for read operation for a file f.
- 620: Check whether requested data are present in cache.
- 630: If the data are present in cache, then:
  - i. Fetch page P from cache and return it to the process.
  - ii. Update LRU age of P in EPAM to 1.
  - iii. If application priority corresponding to cached page in EPAM is not higher than the current requesting process's priority, then change application priority corresponding to cached page in EPAM to the current requesting process' priority and update effective age of P in EPAM to [1 * (1 + priority of requesting process)].
  - iv. If application priority corresponding to cached page in EPAM is higher than the current requesting process's priority, then maintain the application priority.
- 640: If the data are not present in cache, then:
  - i. Read page P from disk.
  - ii. If there are multiple pages in EPAM with the same highest effective age, then remove one page with lowest application priority. Otherwise, remove the page having the oldest effective age from cache.
  - iii. Fill the empty cache slot in EPAM with page P.
  - iv. Update LRU age of P in EPAM to 1.
  - v. Update Application priority mentioned in EPAM against the cached page to the current requesting process' priority.
  - vi. Update effective age of P in EPAM to [1 * (1 + application priority)].
  - vii. Update age of all other pages in EPAM as per normal LRU aging logic.
  - viii. Update effective age of P in EPAM to [LRU age * (1 + priority of requesting process)].

APPLICATION AWARE CACHE MANAGEMENT

FIELD

The field relates generally to information processing systems, and more particularly to techniques for cache management in such systems.

BACKGROUND

A cache refers to a storage component of a computer system that caches data in order to give quick repeat access to the same data. In general, a cache includes high-speed memory (e.g., static RAM (SRAM)) instead of the slower and cheaper dynamic memory that is typically used for main memory (e.g., dynamic RAM (DRAM)). Eviction policies govern which data should remain in the cache. These policies play a significant role in realizing the performance benefits of a cache.

SUMMARY

Illustrative embodiments of the disclosure provide techniques for application aware cache management. In one embodiment, an exemplary computer-implemented method can include maintaining a data structure comprising at least one entry indicative of an importance of at least one of a plurality of applications associated with a storage system; and controlling whether or not a particular data item requested by one of the plurality of applications is cached in a cache memory of the storage system based at least in part on the at least one entry of the data structure.

Illustrative embodiments of the disclosure can provide significant advantages relative to conventional cache management techniques. For example, one or more challenges associated with conventional cache management techniques are overcome by the disclosed techniques for application aware cache management through application aware cache avoidance and/or eviction policies.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
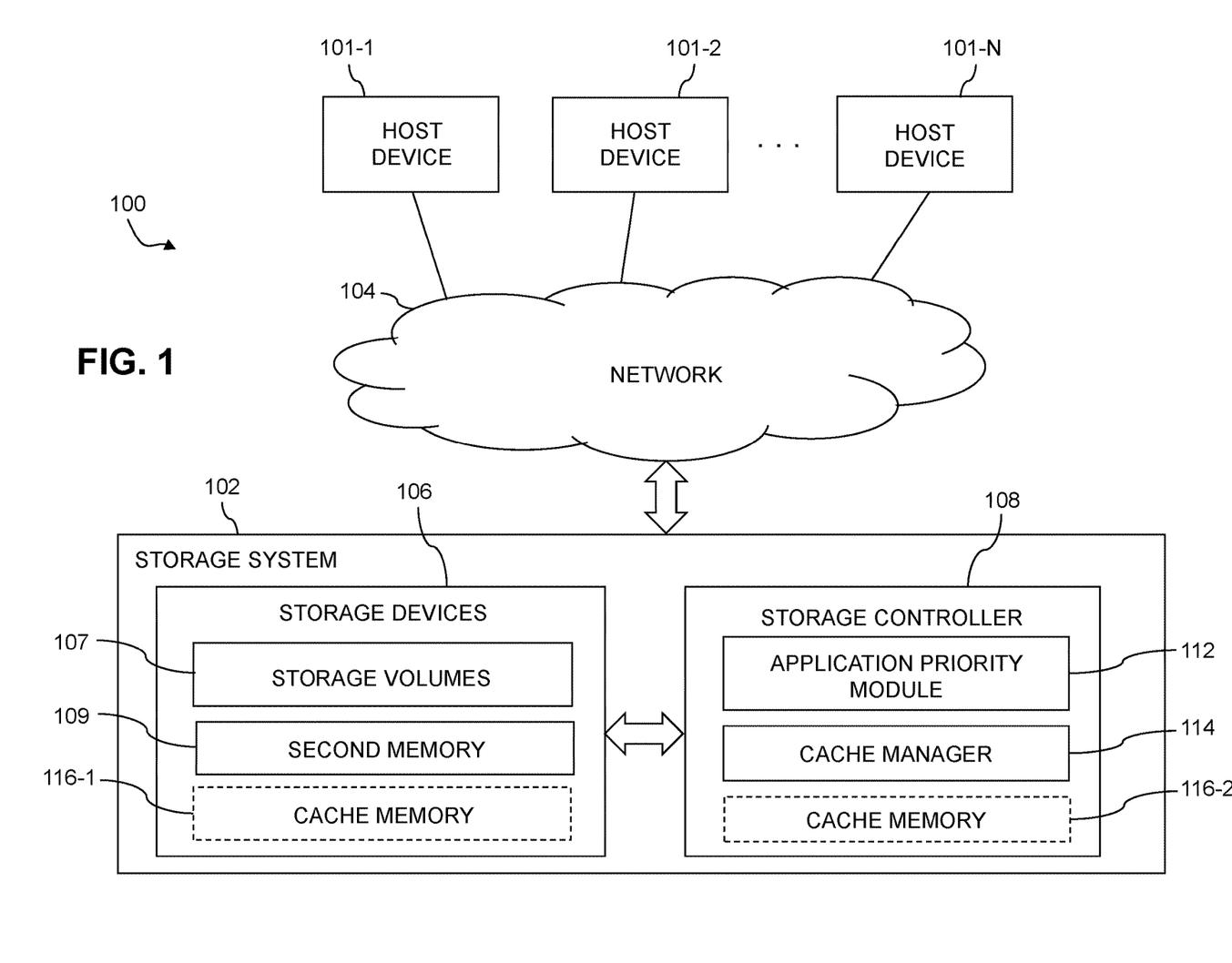
FIG. 1 shows an information processing system configured for application aware cache management in an illustrative embodiment of the disclosure.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a storage system 102. The host devices 101 are configured to communicate with the storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the storage system 102. The term "input-output" as used herein refers to at least one of input and output. For example, IO operations may comprise write requests and/or read requests directed to logical addresses of a particular logical storage volume of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 and an associated storage controller 108. The storage devices 106 store data of a plurality of storage volumes 107. The storage volumes 107 illustratively comprise respective logical units (LUNs) or other types of logical storage volumes. The term "storage volume" as used herein is intended to be broadly construed, and should not be viewed as being limited to any particular format or configuration.

In the FIG. 1 embodiment, the storage system 102 includes at least one cache memory. For example, the cache memory may be implemented as cache memory 116-1 in storage devices 106 and/or as cache memory 116-2 in storage controller 108. In some exemplary embodiments, one or more of the host devices 101 may also include a cache memory. The term "cache memory" as used herein is intended to be broadly construed, and is not intended to be limited to any particular device or configuration. As used herein, "caching" data refers to storing or maintaining data in a cache memory.

In accordance with at least one exemplary embodiment, at least a portion of the storage devices 106 and/or at least a portion of the host devices 101 may include a second memory 109. By way of example, the second memory 109 may correspond to an auxiliary memory, such as a memory generally used to store data that are less frequently accessed, for example.

The storage devices 106 of the storage system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 102.

It is therefore to be appreciated numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell EMC of Hopkinton, Mass. A wide variety of other types of distributed or non-distributed storage arrays can be used in implementing the storage system 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath® driver from Dell EMC. Other types of MPIO drivers from other driver vendors may be used.

The storage controller 108 of storage system 102 in the FIG. 1 embodiment includes an application priority module 112 and a cache manager 114. Functionality for application aware cache management in the storage system 102 is illustratively performed at least in part by the storage controller 108, utilizing its application priority module 112 and/or cache manager 114, in a manner to be described in more detail elsewhere herein.

The storage controller 108 and the storage system 102 may further include one or more additional modules and other components typically found in conventional implementations of storage controllers and storage systems, although such additional modules and other components are omitted from the figure for clarity and simplicity of illustration.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101 and storage system 102 in illustrative embodiments will be described in more detail below in conjunction with FIGS. 8 and 9.

It is to be appreciated that these and other features of illustrative embodiments are presented by way of example only, and should not be construed as limiting in any way.

Accordingly, different numbers, types and arrangements of system components such as host devices 101, storage system 102, network 104, storage devices 106, storage volumes 107, storage controller 108, second memory 109, application priority module 112, cache manager 114 and cache memory 116 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing application priority module 112 and cache manager 114 will be described in more detail with reference to the flow diagram of FIG. 7.

A converged infrastructure or an application cluster, which uses, for example, NAS or SANs, can run a large number and variety of applications. Each of these applications can have different levels of importance or criticality in the application cluster. In these situations, applications may be served by storage solutions in the backend (such as, for example ScaleIO™) which is accessed by the cluster nodes over SAN or NAS. When an application running on a cluster accesses a file, the file access delay on the storage array directly affects application performance. In these situations, recently accessed data may be cached in order to give quick repeat access to the same data.

Existing cache eviction policies (such as least recently used (LRU), least frequently used (LFU), etc.) evict pages based on their respective "definition" of "age" of pages in the resident set. Existing cache eviction policies do not consider the relative importance of the different applications. This can lead to situations where a highly critical real time application is treated the same as a background application (e.g., a scheduled virus scan) by the storage solution for purposes of caching. There is no mechanism in existing storage solutions to give differential treatment to applications at the cache level; rather, all applications are treated equally as far as the cache memory is concerned.

The exemplary embodiments herein describe techniques for application aware eviction policies. According to some exemplary embodiments, higher cache-life is provided to pages demanded by a critical application as compared to a normal application. In at least one example embodiment, administrators may specify the relative importance (e.g., criticality or another priority mechanism) of different applications served by the storage solution. This data can then be fed to the cache subsystem of the storage solution and be considered as part of the eviction policy. The techniques described herein can be integrated into existing cache eviction algorithms by adjusting their respective notion of freshness/staleness of a page. Although some exemplary embodiments are described herein with reference to a LRU cache eviction algorithm, this is not intended to be limiting. For example, those skilled in the art will appreciate that the techniques described herein are also applicable to other caching algorithms, such as LFU, for example.

Cache Avoidance for One-Time Access Applications

In some embodiments, at least a portion of applications that are running on a system (e.g., a converged infrastructure or an application cluster) are not repetitive in nature. In other words, these types of applications (referred to herein as "one-time access applications") do not refer to the same data again in the near future (e.g., within some threshold amount of time). An antivirus application is one example of a one-time access application as there is no performance loss when the antivirus application triggers a scheduled file scan and that file is not cached. This is the case as the antivirus application is not going to scan the same file again in the near future unless, for example, virus definitions are updated just after the file scan is performed. Even then, the performance loss will be minimal (e.g., not noticeable to a user) because the scan was triggered as part of a scheduled scan job (i.e., before and immediately after a virus definition update). Another example of a one-time access application includes a treewalk application, which only periodically calculates the size of each file in a directory. The treewalk application will not access the same file again in the near future. Thus, for one-time access applications, fetching the file into a cache on an access request from a one-time access application can be omitted. While one or more embodiments are discussed herein in the context of one-time access applications, the disclosed techniques for application aware cache management are not limited to one-time access applications, as would be apparent to a person of ordinary skill in the art.

Accordingly, an example embodiment includes determining that one or more applications access data only once over a period of time and/or request data in a scheduled manner, and then preventing read operations requested by these applications from being cached. As such, the limited cache capacity of the storage system can be saved and utilized for other applications. In some example embodiments, one-time access applications are identified manually (e.g., by an administrator) and/or automatically (such as, e.g., based on one or more of metadata associated with a given application, historical data, and machine learning techniques that identify patterns in read requests). An identification of the one-time access applications can then be provided to the cache subsystem (e.g., cache manager 114 in FIG. 1) via a configuration file that identifies the one-time access applications using a name, application identifier, or application path (e.g., bin path), for example. The cache subsystem then loads and refers to this configuration and prevents the data accessed by such applications from being stored into the cache memory.

Figure 2:
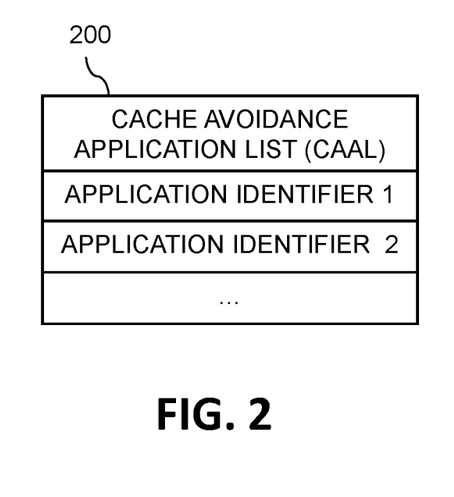
FIG. 2 shows an example of a cache avoidance application list in accordance with exemplary embodiments.

Referring now to FIG. 2, this figure depicts an example of a data structure in the form of a cache avoidance application list (CAAL) 200 in accordance with an exemplary embodiment. The CAAL 200 is used to identify one or more applications (such as one-time access applications, for example). According to some example embodiments, data accessed by applications that are identified in the CAAL 200 are prevented from being cached in a cache memory. Although some of the exemplary embodiments are described herein with reference to the CAAL 200, it is to be appreciated that other formats are also possible such as a data structure that may identify only those applications that are permitted to cache accessed data in the cache memory, for example.

Figure 3:
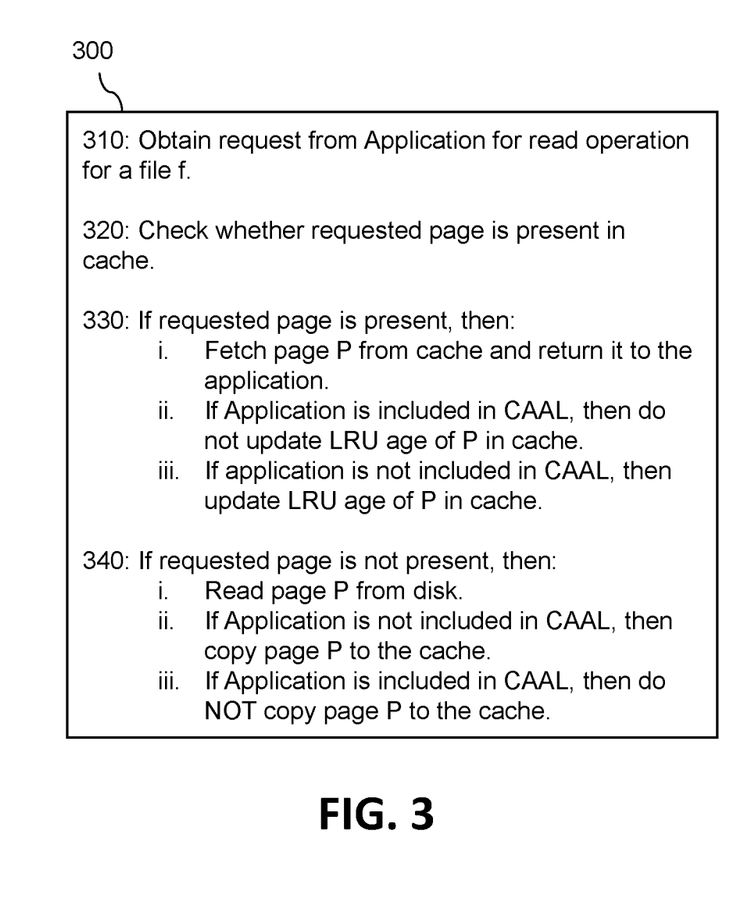
FIG. 3 shows pseudo code corresponding to a cache avoidance algorithm in accordance with exemplary embodiments.

Referring also to FIG. 3, this figure shows pseudo code corresponding to a cache avoidance algorithm 300 in accordance with exemplary embodiments. In this example, the cache avoidance algorithm 300 utilizes CAAL 200. The cache avoidance algorithm 300 includes a step 310 of obtaining a request from an application for a read operation for a file f. The read operation results in a page request from a storage array of a storage system. Step 320 includes checking whether the requested page P is present in the cache memory.

Step 330 is performed if the requested page is present in the cache, and includes: (i) fetching the page from the cache and returning it to the application; (ii) preventing the LRU age of page P from being updated in the cache when the application is included in the CAAL; and (iii) updating the LRU age of page P in the cache when the application is not included in the CAAL.

Step 340 is performed if the requested page is not present in the cache, and includes: (i) reading the requested page P from a secondary (or auxiliary) storage component (e.g., a hard drive disk); (ii) copying page P to the cache memory when the application is not part of the CAAL; and (iii) preventing page P from being copied to the cache memory when the application is part of the CAAL.

Application Aware Cache Eviction Algorithm

In order to bring "application-awareness" to the cache, one or more exemplary embodiments include maintaining an identifier of which application a given page in the cache belongs to, as well as the age bits corresponding to the given page. For example, the application information may be retrieved from the process/thread that initiated the read/write operation.

Figure 4A:
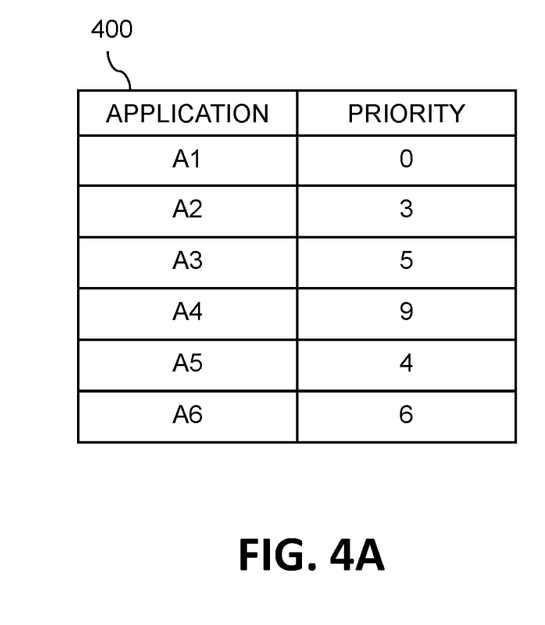
FIGS. 4A-4B show examples of an application priority table and a page age table, respectively, in accordance with exemplary embodiments.

FIG. 4A shows an example data structure for an application priority table 400 in accordance with exemplary embodiments. The application priority table 400 assigns a priority to one or more applications associated with a storage system (e.g., storage system 102). In the example shown in FIG. 4A, the application priority table 400 assigns priorities to six different applications (A1 to A6). In some example embodiments, each application associated with the storage system may be identified by the application priority table 400. For example, each application may be assigned a default priority, and the default priority for a given one of the applications may then be adjusted (such as based on user input from an administrator, for example). Also, in least some example embodiments, the application priority table 400 may identify only those applications that have been assigned a priority, and applications not identified in the application priority table 400 may be treated as having a default priority (e.g., without being added to the application priority table 400).

Figure 4B:
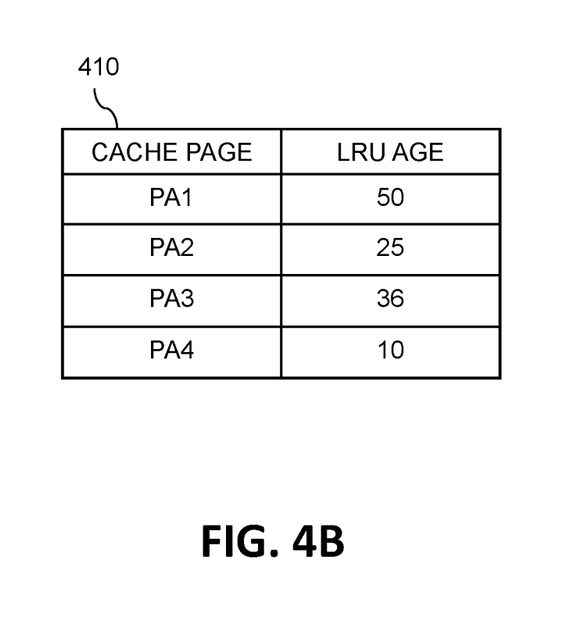

FIG. 4B shows a data structure corresponding to a page age table 410 in accordance with exemplary embodiments. In this example, the page age table 410 corresponds to an LRU algorithm, and tracks LRU age of four different pages (i.e., pages PA1-PA4).

Figure 5:
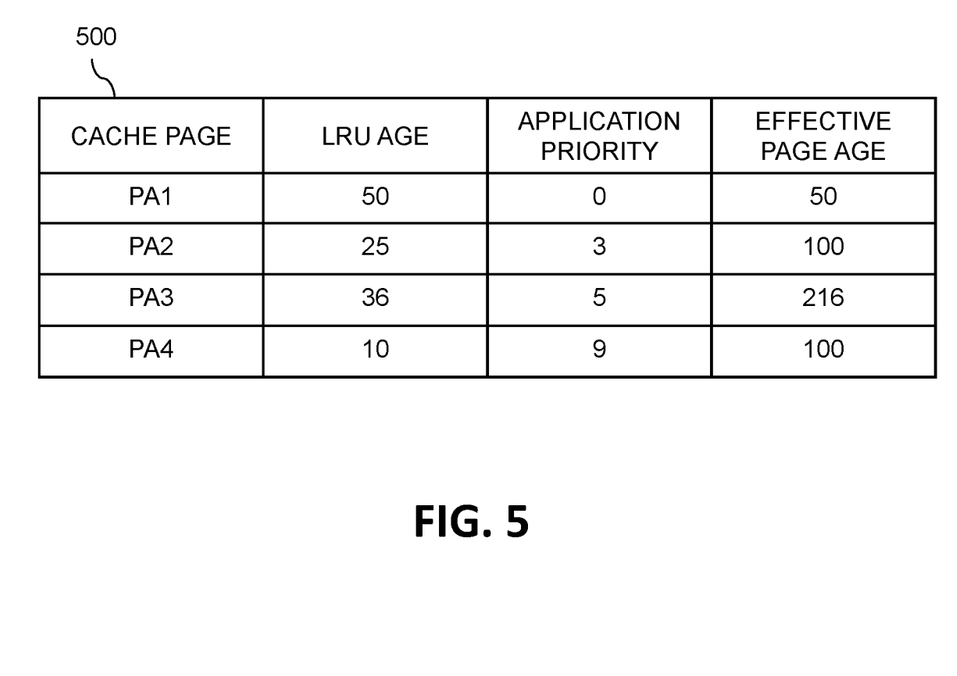
FIG. 5 shows an example of an effective page age matrix in accordance with exemplary embodiments.

FIG. 5 shows a data structure for an LRU effective page age matrix (EPAM) 500 in accordance with exemplary embodiments. The EPAM 500 shown in FIG. 5 is generated based on the application priority table 400, the page age table 410, and the following equation:

Effective Page Age($P$) of application($A$)=LRU Age ($P$)*(1+Application Priority($A$)).

In the example shown in FIG. 5, an application priority of 0 in the EPAM 500 indicates the highest priority and an application priority of 9 indicates the lowest priority. Additionally, the LRU page age starts from 1 (not 0), and a lower effective page age indicates the page is more recent. However, it is to be appreciated that these are merely examples and different priority values are also possible depending on the implementation (e.g., a higher application priority value could indicate a higher application priority as compared to lower application priority values).

Although the design of the EPAM 500 shown in FIG. 5 relates to an LRU algorithm, those skilled in the art will appreciate that the data structure can be adapted to different cache algorithms, such as by replacing the LRU Age column in EPAM 500 with a cache eviction parameter from another algorithm, for example.

Figure 6:
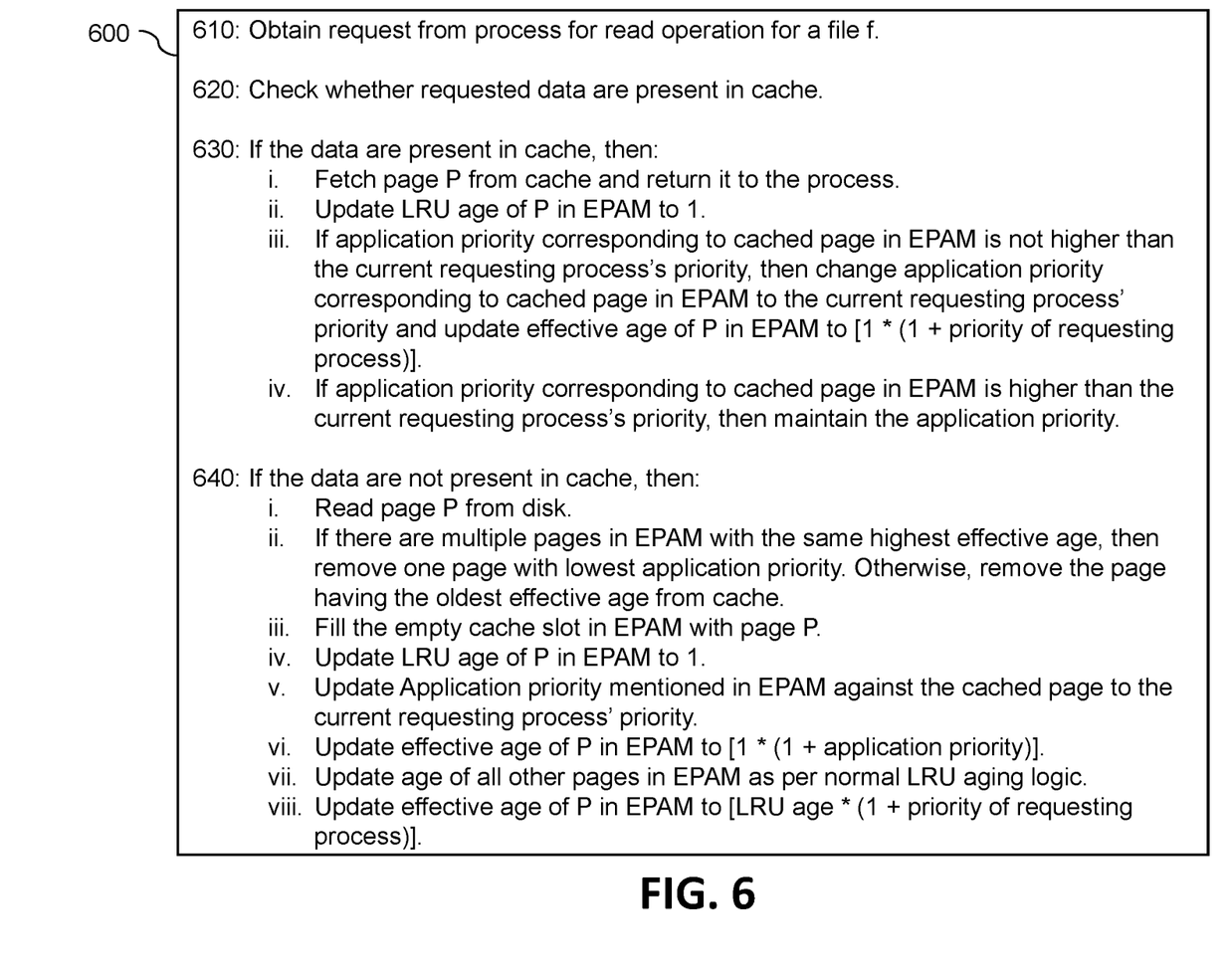
FIG. 6 shows pseudo code corresponding to an application aware least-recently-used algorithm in accordance with exemplary embodiments.

FIG. 6 shows an example of pseudo code for an application aware LRU algorithm 600 in accordance with exemplary embodiments. It is noted that the application aware LRU algorithm 600 in this example uses information from an EPAM in the format shown in FIG. 5. The application aware LRU algorithm 600 includes a step 610 of receiving a request from an application (or process) for a read operation for a file f Next, step 620 checks (e.g., by software associated with storage array) whether the requested data is present in cache.

Step 630 is performed when the requested data is present in the cache, and includes: (i) fetching page P from the cache and returning it to the process; (ii) updating the LRU age of page P in the EPAM to 1; (iii) if the application priority indicated for the cached page P in the EPAM is not higher than the priority of the current requesting process, then the priority in the EPAM for P is changed to a priority of the current requesting application, and the effective age of P in EPAM is set to [1*(1+priority of requesting process)]; and (iv) if the application priority corresponding to the cached page in EPAM is higher than the priority of the of current requesting process, then the application priority is maintained.

Step 640 is performed when the requested data is not present in the cache, and includes: (i) reading page P from a secondary (or auxiliary) memory (e.g., a hard drive disk); (ii) removing the page with the lowest application priority from the cache when there are multiple pages in EPAM with the same highest effective age, otherwise, the oldest page is removed from the cache; (iii) filling the empty cache slot in EPAM with page P; (iv) updating the LRU age of P in EPAM to 1; (v) updating the application priority in EPAM against the cached page to the priority of the current requesting process; (vi) updating the effective age of P in EPAM to [1*(1+application priority)]; (vii) updating the age of all other pages in EPAM via typical LRU aging logic; and (viii) updating the effective age of P in EPAM to [LRU age*(1+ priority of requesting process)].

The application aware LRU algorithm 600 consults and updates the EPAM on each page request.

Figure 7:
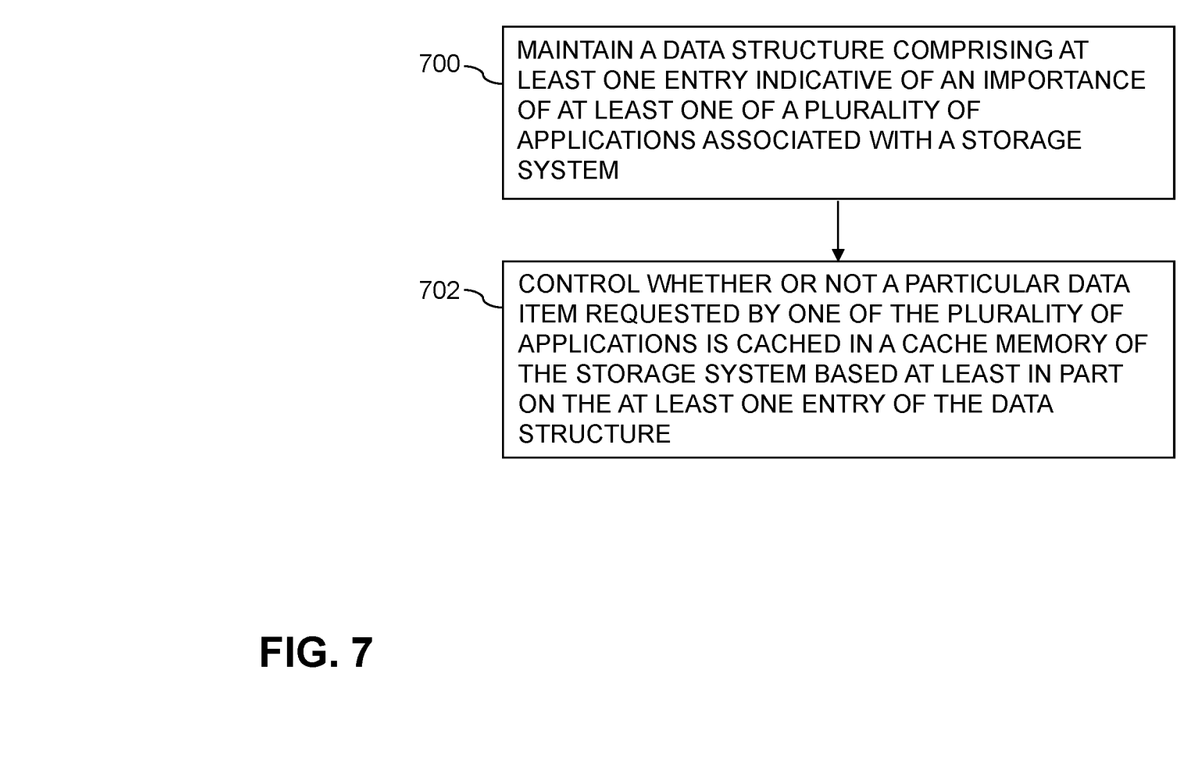
FIG. 7 is a flow diagram of a process for application aware cache management in an illustrative embodiment.

FIG. 7 is a flow diagram of a process for application aware cache management in an illustrative embodiment. It is to be understood that this particular process is only an example, and additional or alternative processes can be carried out in other embodiments.

In this embodiment, the process includes steps 700 through 702. These steps are assumed to be performed by the storage controller 108 utilizing its modules 112 and 114.

Step 700 includes maintaining a data structure comprising at least one entry indicative of an importance of at least one of a plurality of applications associated with a storage system. Step 702 includes controlling whether or not a particular data item requested by one of the plurality of applications is cached in a cache memory of the storage system based at least in part on the at least one entry of the data structure.

The process may include a step of retrieving the particular data item from one of the cache memory and a second memory (e.g., an auxiliary memory) of the storage system. Each entry in the data structure may include an application identifier, and the controlling in step 702 may include: in response to retrieving the particular data item from the second memory, preventing the retrieved particular data item from being copied into the cache memory when an entry in the data structure comprises the application identifier of the application requesting the particular data item. The at least one application corresponding to the at least one entry may one or more of: access data in the storage system based on a predetermined schedule and access data in the storage system only once during a predetermined period of time.

The at least one entry of the data structure may include a priority value. The process may further include a step of maintaining, for each respective data item that is currently stored in the cache memory: a cache eviction parameter value associated with at least one of: a number of times that the respective data item has been requested and a time since the respective data item was last requested; the highest priority value assigned to an application that has requested the respective data item; and an adjusted value of the respective data item that is based at least in part on the cache eviction parameter value and the highest priority value. The controlling of step 702 may be based on the adjusted values. The adjusted value may be computed by multiplying the cache eviction parameter value for the respective data item by: one plus the highest priority value assigned to the application that has requested the respective data item. The process may include a step of retrieving the particular data item from the cache memory; and a step of updating the cache eviction parameter value and the adjusted value corresponding to the particular data item when the priority value of the application requesting the particular data item is higher than the priority value currently maintained for the particular data item. The process may include a step of retrieving the particular data item from a second memory of the storage system; and a step of replacing the data item having the highest adjusted value with the particular data item in the cache memory.

Accordingly, the particular processing operations and other functionality described in conjunction with the flow diagram of FIG. 7 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to account for the relative importance of applications in a cache eviction policy. These and other embodiments can effectively improve the efficiency of cache management, decrease access times to fetch data, and improve performance of critical applications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for application aware cache management in a storage system will now be described in greater detail with reference to FIGS. 8 and 9. Although described in the context of system 100, these platforms may also be used to implement at least portions of other information processing systems in other embodiments.

Figure 8:
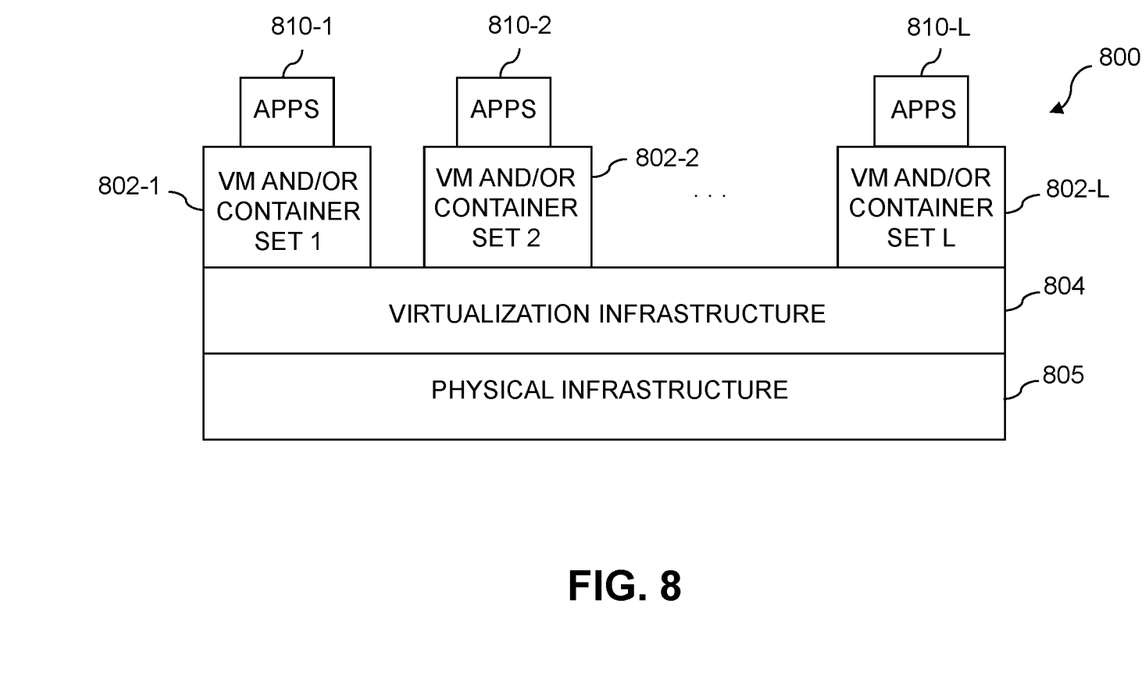
FIGS. 8 and 9 show examples of processing platforms that may be utilized to implement at least a portion of an information processing system in illustrative embodiments.
Figure 9:
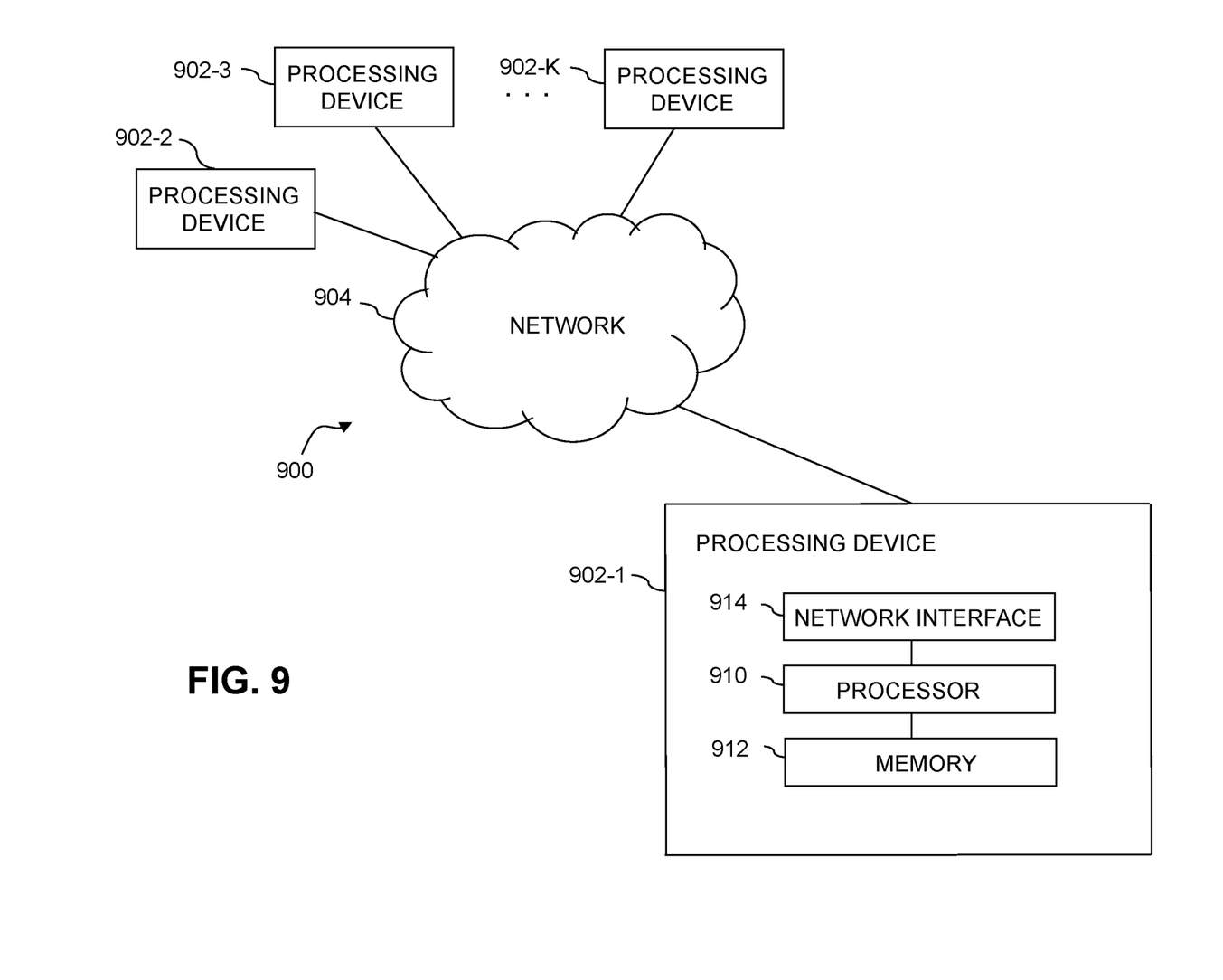

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide functionality for application aware cache management in a storage system of the type described above using one or more processes running on a given one of the VMs. For example, each of the VMs can implement an application priority module 112 and/or other components for implementing functionality for application aware cache management in the storage system 102.

A hypervisor platform may be used to implement a hypervisor within the virtualization infrastructure 804. Such a hypervisor platform may comprise an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can also provide functionality for application aware cache management in a storage system of the type described above. For example, a container host device supporting multiple containers of one or more container sets can implement one or more instances of the application priority module 112 and/or other components for implementing functionality for application aware cache management in the storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for application aware cache management in a storage system of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, storage controllers, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    maintaining a data structure for a plurality of data items currently stored in a cache memory of a storage system, wherein, for each respective data item, the data structure comprises: (i) an eviction parameter value corresponding to a cache eviction algorithm, (ii) a priority value indicative of an importance of at least one of a plurality of applications associated with the storage system, and (iii) an adjusted eviction parameter value of the respective data item that is computed based at least in part on the eviction parameter value and the priority value;
    retrieving a particular data item requested by one of the plurality of applications from one of the cache memory and a second memory of the storage system;
    in response to retrieving the particular data item from the cache memory: (i) updating the eviction parameter value, in the data structure, corresponding to the particular data item; and (ii) when the priority value of the application requesting the particular data item is higher than the priority value currently maintained for the particular data item, changing the priority value in the data structure to the priority value of the application requesting the particular data item and updating the adjusted eviction parameter value, in the data structure, corresponding to the particular data item to a default value incremented by the priority value of the application requesting the particular data item; and
    controlling whether or not the particular data item is cached in the cache memory of the storage system based at least in part on the adjusted eviction parameter values of the data structure;

wherein the method is performed by at least one processing device comprising a hardware processor.

2. The computer-implemented method of claim 1, further comprising:

maintaining a list of one or more application identifiers, and wherein the controlling comprises: in response to retrieving the particular data item from the second memory, preventing the retrieved particular data item from being copied into the cache memory when an application identifier of the application requesting the particular data item is in the list.

3. The computer-implemented method of claim 2, wherein the application requesting the particular data item one or more of: accesses data in the storage system based on a predetermined schedule and accesses data in the storage system only once during a predetermined period of time.

4. The computer-implemented method of claim 1, wherein:

the eviction parameter value is associated with at least one of: a number of times that the respective data item has been requested and a time since the respective data item was last requested; and the priority value is based on a highest priority value assigned to an application that has requested the respective data item.

5. The computer-implemented method of claim 4, wherein, in response to retrieving the particular data item from the second memory, the adjusted eviction parameter value is computed at least in part by multiplying the eviction parameter value for the respective data item by: one plus the highest priority value assigned to the application that has requested the respective data item.

6. The computer-implemented method of claim 1, further comprising:

in response to retrieving the particular data item from the second memory of the storage system, replacing the data item having the highest adjusted eviction parameter value with the particular data item in the cache memory.

7. The computer-implemented method of claim 1, further comprising:

in response to retrieving an additional particular data item from the cache memory, maintaining the priority value of the application in the data structure for the additional particular data item when the priority value of the application requesting the additional particular data item is not higher than the priority value currently maintained for the additional particular data item.

8. A non-transitory processor-readable storage medium having stored therein program code of one or more software programs, wherein the program code when executed by at least one processing device causes the at least one processing device:

to maintain a data structure for a plurality of data items currently stored in a cache memory of a storage system, wherein, for each respective data item, the data structure comprises: (i) an eviction parameter value corresponding to a cache eviction algorithm, (ii) a priority value indicative of an importance of at least one of a plurality of applications associated with the storage system, and (iii) an adjusted eviction parameter value of the respective data item that is computed based at least in part on the eviction parameter value and the priority value;

to retrieve a particular data item requested by one of the plurality of applications from one of the cache memory and a second memory of the storage system;

in response to retrieving the particular data item from the cache memory: (i) to update the eviction parameter value, in the data structure, corresponding to the particular data item; and (ii) when the priority value of the application requesting the particular data item is higher than the priority value currently maintained for the particular data item, to change the priority value in the data structure to the priority value of the application requesting the particular data item and to update the adjusted eviction parameter value, in the data structure, corresponding to the particular data item to a default value incremented by the priority value of the application requesting the particular data item; and to control whether or not the particular data item is cached in the cache memory of the storage system based at least in part on the adjusted eviction parameter values of the data structure.

9. The non-transitory processor-readable storage medium of claim 8, wherein the program code further causes the at least one processing device:

to maintain a list of one or more application identifiers, and wherein the controlling comprises:

in response to retrieving the particular data item from the second memory, preventing the retrieved particular data item from being copied into the cache memory when an application identifier of the application requesting the particular data item is in the list.

10. The non-transitory processor-readable storage medium of claim 9, wherein the application requesting the particular data item one or more of: accesses data in the storage system based on a predetermined schedule and accesses data in the storage system only once during a predetermined period of time.

11. The non-transitory processor-readable storage medium of claim 8, wherein:

the eviction parameter value is associated with at least one of: a number of times that the respective data item has been requested and a time since the respective data item was last requested; and the priority value is based on a highest priority value assigned to an application that has requested the respective data item.

12. The non-transitory processor-readable storage medium of claim 11, in response to retrieving the particular data item from the second memory, the adjusted eviction parameter value is computed at least in part by multiplying the eviction parameter value for the respective data item by: one plus the highest priority value assigned to the application that has requested the respective data item.

13. The non-transitory processor-readable storage medium of claim 8, wherein the program code further causes the at least one processing device:

in response to retrieving an additional particular data item from the cache memory, to maintain the priority value of the application in the data structure for the additional particular data item when the priority value of the application requesting the additional particular data item is not higher than the priority value currently maintained for the additional particular data item.

14. An apparatus comprising:

at least one processing device comprising a processor coupled to a memory;

the at least one processing device being configured:

to maintain a data structure for a plurality of data items currently stored in a cache memory of a storage system, wherein, for each respective data item, the data structure comprises: (i) an eviction parameter value corresponding to a cache eviction algorithm, (ii) a priority value indicative of an importance of at least one of a plurality of applications associated with the storage system, and (iii) an adjusted eviction parameter value of the respective data item that is computed based at least in part on the eviction parameter value and the priority value;

to retrieve a particular data item requested by one of the plurality of applications from one of the cache memory and a second memory of the storage system;

in response to retrieving the particular data item from the cache memory: (i) to update the eviction parameter value, in the data structure, corresponding to the particular data item; and (ii) when the priority value of the application requesting the particular data item is higher than the priority value currently maintained for the particular data item, to change the priority value in the data structure to the priority value of the application requesting the particular data item and to update the adjusted eviction parameter value, in the data structure, corresponding to the particular data item to a default value incremented by the priority value of the application requesting the particular data item; and to control whether or not the particular data item is cached in the cache memory of the storage system based at least in part on the adjusted eviction parameter values of the data structure.

15. The apparatus of claim 14, wherein the at least one processing device is further configured:
to maintain a list of one or more application identifiers, and wherein the controlling comprises:
in response to retrieving the particular data item from the second memory, preventing the retrieved particular data item from being copied into the cache memory when an application identifier of the application requesting the particular data item is in the list.

16. The apparatus of claim 15, wherein the application requesting the particular data item one or more of: accesses data in the storage system based on a predetermined schedule and accesses data in the storage system only once during a predetermined period of time.

17. The apparatus of claim 14, wherein:
the eviction parameter value is associated with at least one of: a number of times that the respective data item has been requested and a time since the respective data item was last requested; and
the priority value is based on a highest priority value assigned to an application that has requested the respective data item.

18. The apparatus of claim 17, in response to retrieving the particular data item from the second memory, the adjusted eviction parameter value is computed at least in part by multiplying the eviction parameter value for the respective data item by: one plus the highest priority value assigned to the application that has requested the respective data item.

19. The apparatus of claim 14, wherein the at least one processing device is further configured:
in response to retrieving the particular data item from the second memory of the storage system, to replace the data item having the highest adjusted eviction parameter value with the particular data item in the cache memory.

20. The apparatus of claim 14, wherein the at least one processing device is further configured:
in response to retrieving an additional particular data item from the cache memory, to maintain the priority value of the application in the data structure for the additional particular data item when the priority value of the application requesting the additional particular data item is not higher than the priority value currently maintained for the additional particular data item.

* * * * *